United States Patent
Yoshida (10) Patent No.: US 8,125,322 B2
(45) Date of Patent: Feb. 28, 2012

(54) VEHICLE-MOUNTED MALFUNCTION NOTIFICATION APPARATUS AND VEHICLE-MOUNTED MALFUNCTION NOTIFICATION METHOD

(75) Inventor: Hiroaki Yoshida, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 481 days.

(21) Appl. No.: 12/516,132

(22) PCT Filed: Oct. 31, 2007

(86) PCT No.: PCT/IB2007/003293
§ 371 (c)(1),
(2), (4) Date: May 22, 2009

(87) PCT Pub. No.: WO2008/062266
PCT Pub. Date: May 29, 2008

(65) Prior Publication Data
US 2010/0066521 A1 Mar. 18, 2010

(30) Foreign Application Priority Data
Nov. 24, 2006 (JP) ................................. 2006-317466

(51) Int. Cl.
*B60Q 1/00* (2006.01)
*G01M 17/00* (2006.01)
*G06F 19/00* (2011.01)

(52) U.S. Cl. ............ 340/438; 340/439; 701/29; 701/30; 701/33

(58) Field of Classification Search .................. 340/438, 340/439; 701/29, 30
See application file for complete search history.

(56) References Cited

U.S. PATENT DOCUMENTS

| 6,275,148 B1 | 8/2001 | Takamura et al. | |
| 6,735,504 B2 * | 5/2004 | Katagishi et al. | 701/33 |
| 6,938,190 B2 * | 8/2005 | Okuda | 714/55 |
| 7,082,357 B2 * | 7/2006 | Fujita et al. | 701/29 |
| 2003/0197603 A1 | 10/2003 | Stewart et al. | |
| 2006/0220813 A1 | 10/2006 | Utter et al. | |

FOREIGN PATENT DOCUMENTS

| DE | 201 22 551 | 3/2006 |
| DE | 10 2005 008 022 | 8/2006 |
| EP | 0 284 895 | 10/1988 |
| JP | 4 287854 | 10/1992 |

(Continued)

OTHER PUBLICATIONS

Office Action issued Sep. 22, 2010, in German Patent Application No. 11 2007 002 808.4-32 (with English translation).

(Continued)

*Primary Examiner* — Donnie Crosland
(74) *Attorney, Agent, or Firm* — Oblon, Spivak, McClelland, Maier & Neustadt, L.L.P.

(57) ABSTRACT

A vehicle-mounted malfunction notification apparatus having a communication malfunction notification unit that notifies a vehicle operator of a communications malfunction when a malfunction occurring in a communications device persists for a specified period of time, includes a maintenance operation checking unit and a maintenance operation processing unit. The maintenance operation checking unit determines whether a maintenance operation for the communications device is being performed. The maintenance operation processing unit notifies the vehicle operator that the maintenance operation is being performed when the maintenance operation checking unit determines that the maintenance operation is being performed.

10 Claims, 3 Drawing Sheets

FOREIGN PATENT DOCUMENTS

| | | |
|---|---|---|
| JP | 10 138738 | 5/1998 |
| JP | 2001 188975 | 7/2001 |
| JP | 2002-248913 | 9/2002 |
| JP | 2004 122934 | 4/2004 |
| JP | 2004 314771 | 11/2004 |

OTHER PUBLICATIONS

"Beru Tire Pressure Control System TSS Calibration Instructions", http://www.beru.com/download/produkte/kalibrierung_tss_d.pdf, BERU, pp. 1-33 (2006).

* cited by examiner

VEHICLE-MOUNTED MALFUNCTION NOTIFICATION APPARATUS AND VEHICLE-MOUNTED MALFUNCTION NOTIFICATION METHOD

BACKGROUND OF THE INVENTION

1. Field of the Invention

The present invention relates to a vehicle-mounted malfunction notification apparatus and a vehicle-mounted malfunction notification method. In particular, the invention relates to a vehicle-mounted malfunction notification apparatus and a vehicle-mounted malfunction notification method that warn a vehicle operator when a communication malfunction in a communications device has been detected over a specified period of time. In particular, the malfunctions detected include communication malfunctions such as a communications failure, a deterioration in receiving sensitivity or the like.

2. Description of the Related Art

Japanese Patent Application Publication No. 2004-122934 (JP-A-2004-122934) describes a vehicle-mounted malfunction notification apparatus that turns on an indicator lamp in a vehicle when an malfunction is detected in communicating the tire air pressure information as well as when a tire air pressure too low. The above vehicle-mounted malfunction notification apparatus includes sensor transmitters provided at a wheel side and a sensor receiver provided at a vehicle body side. In the above vehicle-mounted malfunction notification apparatus, the tire air pressure information detected by the sensor transmitters is wirelessly transmitted to the sensor receiver and, thereafter, it is determined whether the tire air pressure is too low based on the tire air pressure information received by the sensor receiver. If it is determined that the tire air pressure is too low, it is considered that the malfunction has occurred in the tire air pressure, so that the indicator lamp is turned on. Also, in the above vehicle-mounted malfunction notification apparatus, it is determined whether the duration in which the tire air pressure information from the sensor transmitters is not received by the sensor receiver exceeds a specified period of time. If it is determined that the duration exceeds a specified period of time, it is considered that a communication malfunction has occurred and the indicator lamp is turned on.

A vehicle maintenance operation such as replacing tires, registering ID numbers of sensors or the like is performed in a vehicle maintenance and repair shop. After the maintenance operation is completed, it is required, before the vehicle is delivered to an owner, to check whether the normal communications between the sensor transmitters and the sensor receiver have been restored. However, as in the related art, if the duration in which the information from the sensor transmitters is not received by the sensor receiver needs to exceed a specified period of time before it can be determined whether the communication malfunction has occurred, the time for the maintenance operation including the communications checking process may be prolonged. Further, in the configuration in which the indicator lamp for notifying the communication malfunction is first turned on only after the specified period of time has elapsed without receiving the information, as in the related art, no indication that the maintenance operation is being properly performed is given to a maintenance worker during while performing the maintenance operation. Thus, it is difficult for the maintenance worker to determine whether the maintenance operation is being performed, which deteriorates working efficiency.

SUMMARY OF THE INVENTION

The invention provides a vehicle-mounted malfunction notification apparatus and a vehicle-mounted malfunction notification method that have improved working efficiency in a maintenance operation for a communications device or related parts thereof, in which a warning is given to the vehicle operator only when a communication malfunction persists for at least a specified period of time.

In accordance with a first aspect of the present invention, there is provided a vehicle-mounted malfunction notification apparatus having a communication malfunction notification unit that informs a vehicle operator of a communication malfunction when a communications malfunction of a communications device persists for a specified period of time. The vehicle-mounted malfunction notification apparatus includes a maintenance operation checking unit and a maintenance operation processing unit. The maintenance operation checking unit determines whether a maintenance operation is being performed on the communications device or related parts of the communications device. The maintenance operation processing unit informs the vehicle operator that the maintenance operation is being performed when the maintenance, operation checking unit determines that the maintenance operation is being performed.

In the first aspect of the present invention, if the communication malfunction of the communications device persists for a specified period of time, the vehicle operator is warned of the communication malfunction. While the maintenance operation for the communications device or the related parts thereof is being carried out, the vehicle operator (the maintenance worker) is informed of the execution of the maintenance operation regardless of whether the communication malfunction of the communications device persists for the specified period of time. In accordance with the above configuration, even if the conditions required to warn the communication malfunction are not satisfied, the process that informs the maintenance worker of the execution of the maintenance operation is performed, so that the maintenance worker can recognize the execution of the maintenance operation. As a result, the working efficiency of the maintenance operation can be improved.

In the vehicle-mounted malfunction notification apparatus, the maintenance operation processing unit may include a maintenance operation notification unit that warns the vehicle operator that the maintenance operation is being performed when the maintenance operation checking unit determines that the maintenance operation is being performed. In this case, because the execution of the maintenance operation is indicated while the maintenance operation is being performed, the maintenance worker can recognize that the maintenance operation is being performed, which improves the efficiency of the maintenance operation.

In the vehicle-mounted malfunction notification apparatus, when it is detected that the communications device is operating normally, the maintenance operation notification unit stops issuing the warning to the vehicle operator that the maintenance operation is being performed. In this case, the performance of the maintenance operation is continues to be indicated until normal communication of the communications device is restored, so that the maintenance worker can recognize the execution of the maintenance operation until the communications become normal after the completion of the maintenance operation. Accordingly, the efficiency can be improved.

In the vehicle-mounted malfunction notification apparatus, the maintenance operation processing unit may include a communication malfunction persistence-period reducing unit that shortens the specified period of time over which a communication malfunction must persist when the maintenance operation checking unit determines that the maintenance operation is being performed. In this case, after the maintenance operation has started, the communication malfunction of the communications device is indicated at an earlier timing than usual. Thus, the maintenance worker is notified of the occurrence of the communication malfunction when the maintenance operation is performed, which makes it possible to improve the efficiency of the maintenance operation.

In the vehicle-mounted malfunction notification apparatus, when a malfunction in the wireless communications between transmitters and a receiver of a system that detects tire air pressures of the vehicle persists for a specified period of time, the communication malfunction notification unit may turn on or blinks an indicator lamp installed in the instrument cluster to inform the vehicle operator of a communication malfunction. In this case, during the tire replacement process, even if the abnormal wireless communications state between the transmitters and the receiver of the system that detects tire air pressures is not detected for the specific period of time, the process that informs the maintenance worker that the tires are being replaced is performed. As a consequence, the operator can recognize the tire replacement process is being performed and, hence, the working efficiency of the tire replacement process can be improved.

In the vehicle-mounted malfunction notification apparatus, in order to inform the vehicle operator that the maintenance operation is being performed, the maintenance operation time notification unit may turn on or blinks the specific lamp that is turned on or blinked to inform the vehicle operator of the communication malfunction.

In the present invention, "communication malfunction" indicates a communications state that is not general, such as a communications failure, a low receiving sensitivity or the like. Furthermore, in the present invention, "vehicle operator" includes a driver or a maintenance worker of the vehicle.

In accordance with the first aspect of the present invention, it is possible to improve the working efficiency in a maintenance operation for a communications device or related parts thereof such as components having the communications device or the like, in which a communication malfunction needs to last for a specific period of time in order to give a warning to a vehicle operator.

In accordance with a second aspect of the present invention, there is provided a vehicle-mounted malfunction notification method that informs a vehicle operator of a communication malfunction when a communications malfunction of a communications device persists for a specified period of time. The vehicle-mounted malfunction notification method includes: determining whether a maintenance operation is being performed on the communications device or related parts of the communications device; and performing a process, when it is determined that the maintenance operation is being performed, to notify the vehicle operator that the maintenance operation is being performed.

BRIEF DESCRIPTION OF THE DRAWINGS

The above and other features of the present invention will become apparent from the following description of embodiments given in conjunction with the accompanying drawings, in which.

DETAILED DESCRIPTION OF EMBODIMENTS

Hereinafter, example embodiments of the present invention will be described with reference to the accompanying drawings.

Figure 1:
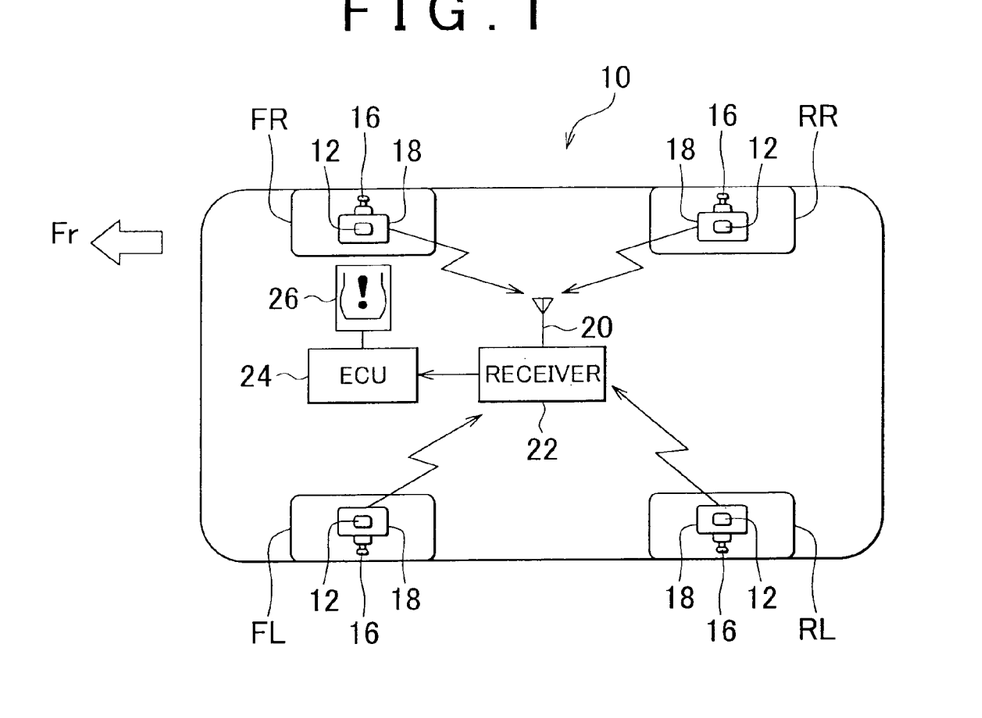
FIG. 1 illustrates a system configuration of a vehicle-mounted malfunction notification apparatus in accordance with a first embodiment of the present invention.
Figure 2:
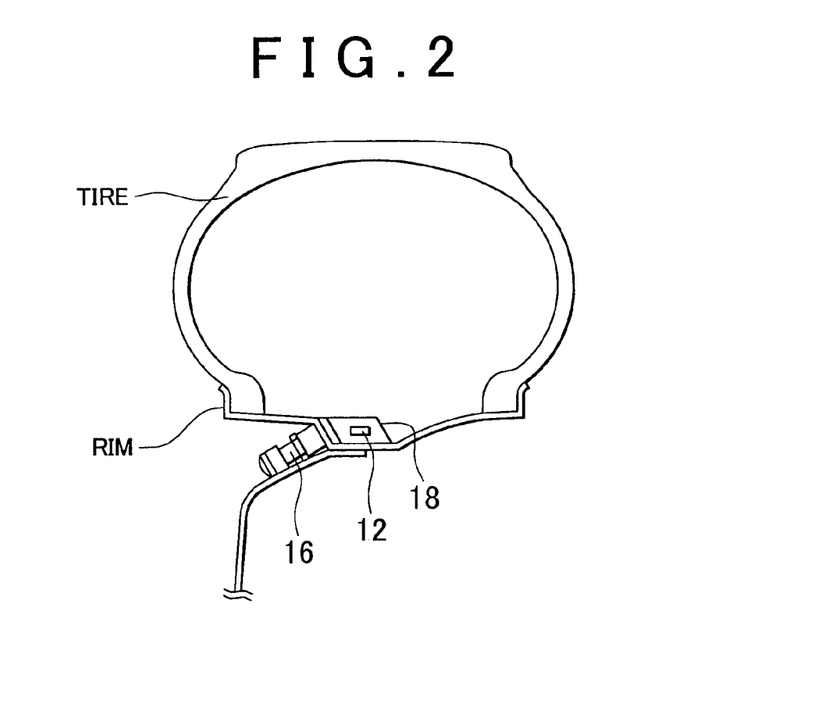
FIG. 2 illustrates a cross sectional view of principal parts of tires attached to a vehicle having the vehicle-mounted malfunction notification apparatus in accordance with the first embodiment of the present invention.

FIG. 1 illustrates a system configuration of a vehicle-mounted malfunction notification apparatus 10 in accordance with a first embodiment of the present invention; and FIG. 2 illustrates a cross sectional view of principal parts of tires attached to a vehicle having the vehicle-mounted malfunction notification apparatus 10 in accordance with the first embodiment of the present invention. The vehicle-mounted malfunction notification apparatus 10 in accordance with this embodiment is applied to a system that detects air pressures of tires on a vehicle, and issues a warning of an abnormal tire air pressure state detected by the system or communications malfunction between transmitters and a receiver of the system.

As shown in FIG. 1, an air pressure sensor 12 that detects the tire air pressure is provided at each wheel FL, FR, RL and RR of the vehicle. The air pressure sensor 12 is installed as a unit with a tire valve 16 provided at a wheel rim 14 of each of the wheels FL, FR, RL and RR. Further, the air pressure sensor 12 is installed in each of transmitters 18 that transmit a radio wave. The air pressure sensor 12 detects the tire air pressure of the corresponding wheel FL, FR, RL or RR at specified time intervals while using a built-in battery as a power source. The detected tire air pressure information is transmitted by the transmitter 18 to the vehicle main body along with an ID number that is read from a nonvolatile memory and used distinguish between each sensor 12.

The vehicle main body is provided with a receiver 22 that has a receiving antenna 20. The receiver 22 wirelessly communicates with the transmitters 18 of the wheels and thus receives the tire air pressure information transmitted through the transmitters 18 of the wheels FL, FR, RL and RR along with the respective ID numbers.

The vehicle-mounted malfunction notification apparatus 10 has an electronic control unit (hereinafter, referred to as "ECU") 24 that includes a computer as its main component. The ECU 24 is connected with the receiver 22. When the receiver 22 receives the tire air pressure information from the transmitters 18 of the wheels FL, FR, RL and RR along with the ID numbers, the received information is transmitted to the ECU 24. The ECU 24 determines whether the tire air pressures are normal based on the tire air pressure information transmitted from the receiver 22.

The ECU 24 is also connected with an indicator lamp 26. The indicator lamp 26 is provided in the combination meter. When an abnormal tire air pressure is detected, or when communications malfunction between the transmitters 18 and the receiver 22 is detected as will be described later, the ECU 24 issues a command to turn on ("ON command") the warning lamp 26 to thereby inform the vehicle operator (a driver or a maintenance worker) of the malfunction. The warning lamp 26 is turned on when receiving the ON command from the ECU 24.

The following is a description of an operation of the vehicle-mounted malfunction notification apparatus 10 in accordance with this embodiment.

In accordance with vehicle-mounted malfunction notification apparatus 10 of this embodiment, the air pressure sensors 12 of the wheels FL, FR, RL and RR detect the tire air pressure of each at a specified time interval T1 (e.g., every one minute, every five minutes or the like). Then, the detected tire air pressure information is wirelessly transmitted by the transmitters 18 to the receiver 22 along with the ID numbers of the respective sensors. When the vehicle main body side receiver 22 receives, when the vehicle is started, the tire air pressure information transmitted through the transmitter 18 of any one of the wheels FL, FR, RL and RR along with the corresponding ID number of the air pressure sensor 12 that has detected the tire air pressure, the received information is supplied to the ECU 24.

After receiving the tire air pressure information and the ID number from the receiver 22, the ECU 24 determines whether the tire air pressure has decreased below a specific level. If it is determined that the tire air pressure has not decreased, no corrective action is required. On the other hand, if it is determined that the tire air pressure has decreased, the ON command for the indicator lamp 26 is issued to notify the vehicle operator of the abnormal tire air pressure. When the ON command is issued, the indicator lamp 26 is turned on, and the vehicle operator is notified of the abnormal tire air pressure. Moreover, after determining the tire air pressure state, the ECU 24 stores the tire air pressure information in a built-in nonvolatile memory together with the corresponding ID number of the air pressure sensor 12 that detected the tire air pressure.

The ECU 24 the ID number and the corresponding air pressure sensor 12 at the wheels FL, FR, RL and RR are stored in the nonvolatile memory. The correspondence relationship between the ID number and associated air pressure sensor 12 with a particular wheel may be modified through a registration operation by using external tool that may be connected to the ECU 24.

The ECU 24 determines whether a communications malfunction (hereinafter, referred to as "communication malfunction") persists for a specified period of time T2 for each air pressure sensor 12 of the wheels FL, FR, RL and RR. Here, the communication malfunction may be a malfunction with the receiver 22 when it cannot receive the radio wave containing the tire air pressure information transmitted by the transmitter 18, a condition where a receiving sensitivity decreases below a specific level, or the like. Further, the specified period of time T2 indicates a period of time (e.g., 20 minutes, 60 minutes or the like, which is long enough to allow the radio wave to be transmitted through the transmitter 18 several times) at least twice as long as the time interval T1 needed to transmit the tire air pressure information. As a result of the determination, the ID number of each air pressure sensors 12 of the wheels FL, FR, RL and RR, if the receiver malfunction does not persist for the specified period of time T2, no treatment for the communication malfunction is performed thereafter.

On the other hand, if a receiver malfunction at any of the air pressure sensors 12 of the wheels FL, FR, RL and RR persists for the specified period of time T2, the ON command for the indicator lamp 26 is issued to notify the vehicle operator of the communications malfunction between the wheel side transmitters 18 and the vehicle main body side receiver 22. When the ON command is issued, the indicator lamp 26 is turned on, and the vehicle operator is notified of the communications malfunction. Moreover, when the communications malfunction between any one of the wheel side transmitters 18 and the vehicle main body side receiver 22 is detected, the ECU 24 stores in the nonvolatile memory the ID number of the air pressure sensor 12 in which the communications malfunction occurred so that a diagnostic check may be performed later.

As set forth above, in the vehicle-mounted malfunction notification apparatus 10 in accordance with this embodiment, it is possible to turn on the indicator lamp 26 in the combination meter installed in front of the driver's seat, at least one of when there occurs any tire air pressure malfunction in which the tire air pressure of any one of the wheels FL, FR, RL and RR decreases, and when there occurs a communication malfunction in which the abnormal wireless communications state between one or more transmitters 18 of the air pressure sensors 12 disposed at the wheels FL, FR, RL and RR and the vehicle main body side receiver 22 lasts for the specific period of time T2. As a consequence, the vehicle operator is notified of the abnormal tire air pressure state or the communications malfunction. In accordance with this embodiment, the indicator lamp 26 can be prevented from being turned on due to temporary communications malfunction (e.g., a communications failure, a deterioration of the receiving sensitivity or the like that occurs briefly) between the transmitters 18 and the receiver 22, which makes it possible to prevent the indicator lamp 26 from being turned on unnecessarily.

The corresponding tire of the wheels FL, FR, RL and RR is replaced when the malfunction has occurred in the tire air pressure or in the wireless communications for the air pressure sensor 12. Also, the tires are also replaced when they are flat or worn out or when snow accumulates high on the road. After the tires or the air pressure sensors 12 are replaced, the ID numbers of the air pressure sensors 12 need to be registered in the nonvolatile memory of the ECU 24 by means of the external tools connected with the ECU 24. Moreover, it is required to check whether the wireless communications between the wheel side transmitters 18 and the vehicle main body side receiver 22 is normally executed after the completion of the maintenance operation such as replacing tires, registering ID numbers or the like.

After the maintenance operation is completed, the vehicle is operated in an accessory-on state by the maintenance worker. At this time, if the specified period of time T2 is required to determine whether normal communications between the wheel side transmitters 18 and the vehicle main body side receiver 22 is restored, the time for the maintenance operation including the communications checking process is increased. Further, in the configuration in which the indicator lamp 26 for notifying the communications malfunction is not turned on until the receiver malfunction persists for the specified period of time T2, no indication that the maintenance operation is being performed is given to a maintenance worker while the maintenance operation is performed. Thus, it is difficult for the maintenance worker to determine whether the maintenance operation is being performed, which reduces efficiency.

Figure 3:
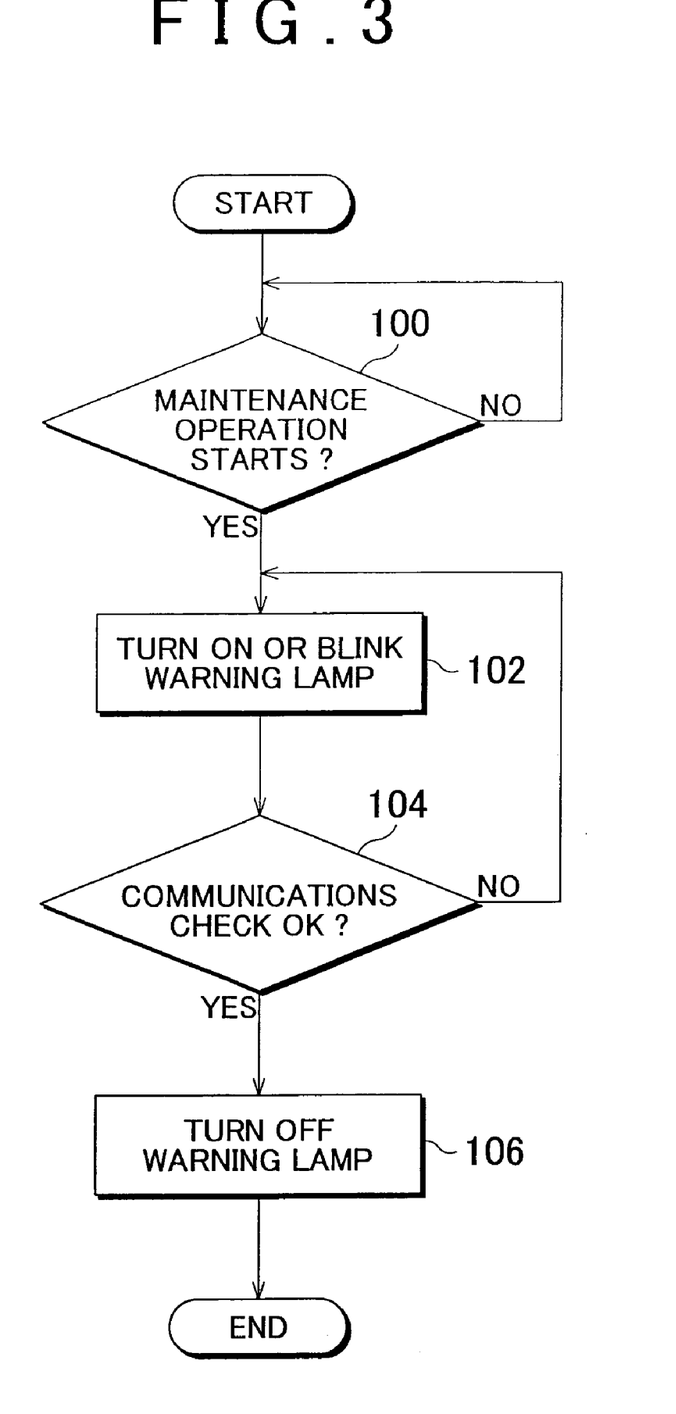
FIG. 3 illustrates a flowchart of an example of a control routine performed in the vehicle-mounted malfunction notification apparatus in accordance with the first embodiment of the present invention.

Hence, the vehicle-mounted malfunction notification apparatus 10 in accordance with this embodiment is characterized by the improved working efficiency in the maintenance operation such as replacing the tires of wheels equipped with the transmitters 18, wherein the vehicle operator is notified of the communication malfunction when the receiver malfunction persists for the specified period of time T2. Hereinafter, the features of this embodiment will be described with reference to FIG. 3. FIG. 3 describes a flowchart of an example of a control routine executed in the vehicle-mounted malfunction notification apparatus 10 in accordance with this embodiment.

In the vehicle-mounted malfunction notification apparatus 10 in accordance with this embodiment, the ECU 24 checks, at a specific time interval when the vehicle is started, whether the tire maintenance operation is being performed (step 100). Preferably, it is determined that the maintenance operation is being performed when it is detected that, based on a relationship of wheel speeds which are detected by wheel speed sensors of the wheels FL, FR, RL and RR, specific conditions that infer the start of the tire replacement are satisfied; when it is detected that an external tool is connected with the ECU 24 for the registration of the ID numbers; or when it is detected that a specific diagnostic check operation on the ECU 24 has started.

If it is determined that the maintenance operation is not being performed, the process of the step 100 is repeated. On the other hand, when the maintenance operation is being performed, the ON command for the indicator lamp 26 is issued to notify the maintenance worker that the tire maintenance operation is being performed (step 102). When the ON command is issued, the indicator lamp 26 is turned on, and the maintenance worker is notified that the maintenance operation is being performed.

After the tire replacement or the ID registration is completed, the maintenance worker checks whether the normal wireless communications between the wheel side transmitters 18 and the vehicle main body side receiver 22 is restored.

After the warning lamp 26 is turned on to indicate the performance of the tire maintenance operation, the ECU 24 checks, for all ID numbers of the air pressure sensors 12 of the wheels FL, FR, RL and RR that are registered in the nonvolatile memory, whether the wireless communications between the transmitters 18 and the receiver 22 are operating normally (step 104) by monitoring whether the radio wave that contains the tire air pressure information transmitted from the transmitters 18 is appropriately received by the receiver 22.

It is preferable that the communications state in step 104 is checked after the completion of the tire maintenance operation, e.g., replacing tires, registering ID numbers or the like. Further, the maintenance operation is preferable determined as being completed: when it is detected that, based on a relationship of wheel speeds which are detected by wheel speed sensors of the wheels FL, FR, RL and RR, specific conditions that infer the completion of the tire replacement are satisfied; when it is detected that an external tool that has been connected with the ECU 24 are disconnected; or when it is detected that a specific diagnostic check operation on the ECU 24 has been completed.

As a result of checking the communications state, the process of step 102 is repeated when it is determined that the wireless communications is malfunctioning for one or more ID numbers of the air pressure sensors 12 of the wheels FL, FR, RL or RR. On the other hand, when it is determined that the wireless communications are normally executed for all ID numbers of the air pressure sensors 12 of the wheels FL, FR, RL and RR, a turn-off command for the warning lamp 26 is issued (step 106). When the turn-off command is issued, the warning lamp 26 is turned off.

As described above, in the vehicle-mounted malfunction notification apparatus 10 in accordance with this embodiment, after the maintenance operation has started, the warning lamp 26 installed in the combination meter may be turned on regardless of whether the abnormal wireless communications state between the transmitters 18 and the receiver 22 lasts for the specified period of time T2.

In accordance with the above configuration, during the execution of the maintenance operation, even if the conditions required to turn on the indicator lamp 26 to indicate the communication malfunction are not satisfied, and specifically even if the abnormal wireless communications state between the transmitters 18 and the receiver 22 does not lasts for the specified period of time T2, the warning is given by turning on the indicator lamp 26 to notify the maintenance worker that the maintenance operation is being performed. Thus, in the vehicle-mounted malfunction notification apparatus 10 in accordance with this embodiment, a maintenance worker who performs the maintenance operation may easily determine whether the maintenance operation is being performed, which makes it possible to improve the working efficiency. Here, the maintenance operation includes registering in the ECU 24 the respective ID numbers related to the transmitters 18, replacing tires of wheels equipped with the transmitters 18, wherein the indication of the communication malfunction by the warning lamp 26 is given to the vehicle operator when a malfunction in the communications with the receiver 22 persists for the specified period of time T2.

Furthermore, in the vehicle-mounted malfunction notification apparatus 10 in accordance with this embodiment, the warning lamp 26 is turned off when the normal wireless communications state between the transmitters 18 and the receiver 22 is restored for all ID numbers of the air pressure sensors 12 of the wheels FL, FR, RL and RR.

In accordance with the above configuration, the indication given by the indicator lamp 26 to notify the execution of the maintenance operation, such as replacing tires or the like, continues until the normal wireless communications state between the transmitters 18 and the receiver 22 is restored after the completion of the maintenance operation. Therefore, the maintenance worker is notified of the performance of the maintenance operation by the indicator lamp 26 at any time before the maintenance operation is completed. Further, when restoration of normal wireless communications between the transmitters 18 and the receiver 22 is detected after the completion of the maintenance operation, the notification provided by the indicator lamp 26 ends. Accordingly, by turning off the indicator lamp 26, the maintenance worker can recognize the maintenance operation has been completed such that normal wireless communications between the transmitters 18 and the receiver 22 can be restored.

If a communications malfunction between the transmitters 18 and the receiver 22 is detected even after the completion of the maintenance operation, the indicator lamp 26 remains turned on. Accordingly, the maintenance worker can recognize that the maintenance operation has been completed without restoring the wireless communications state to normal. On the other hand, if the wireless communications state between the transmitters 18 and the receiver 22 is detected to be normal, the indicator lamp 26 is turned off. Therefore, the maintenance worker can quickly, i.e., without waiting for the specified period of time T2, recognize that the maintenance operation has been completed such that the normal wireless communications between the transmitters 18 and the receiver 22 can be resumed. As for the specified period of time T2, it is determined that the communication malfunction occurs when communications malfunction between the transmitters 18 and the receiver 22 persists for the specified period of time T2.

Accordingly, in the vehicle-mounted malfunction notification apparatus 10 in accordance with this embodiment, the time for the maintenance operation including a post communications checking process can be entirely shortened, thus improving the working efficiency. Here, the maintenance operation includes registering the ID numbers related to the transmitters 18 in the ECU 24, replacing tires of wheels equipped with the transmitters 18, wherein the warning of the communication malfunction by turning on the indicator lamp 26 is given to the vehicle operator when the malfunction in the radio receiver persists for the specified period of time T2.

In the above first embodiment, when the ECU 24 detects a communications malfunction between the transmitters 18 and the receiver 22 that persists for the specified period of time T2, e.g., during which the radio wave that contains the ID number of the air pressure sensor 12 of any one of the wheels FL, FR, RL and RR is not received by the receiver 22 or the receiving sensitivity thereof is reduced below a specific level, the ON command for the warning lamp 26 is issued, thus implementing a communication malfunction notification unit. A maintenance operation checking unit is implemented by performing the process of the step 100 among the routine shown in FIG. 3. In addition, a maintenance operation processing unit and maintenance operation notification unit are implemented by performing the process of the step 102.

Figure 4:
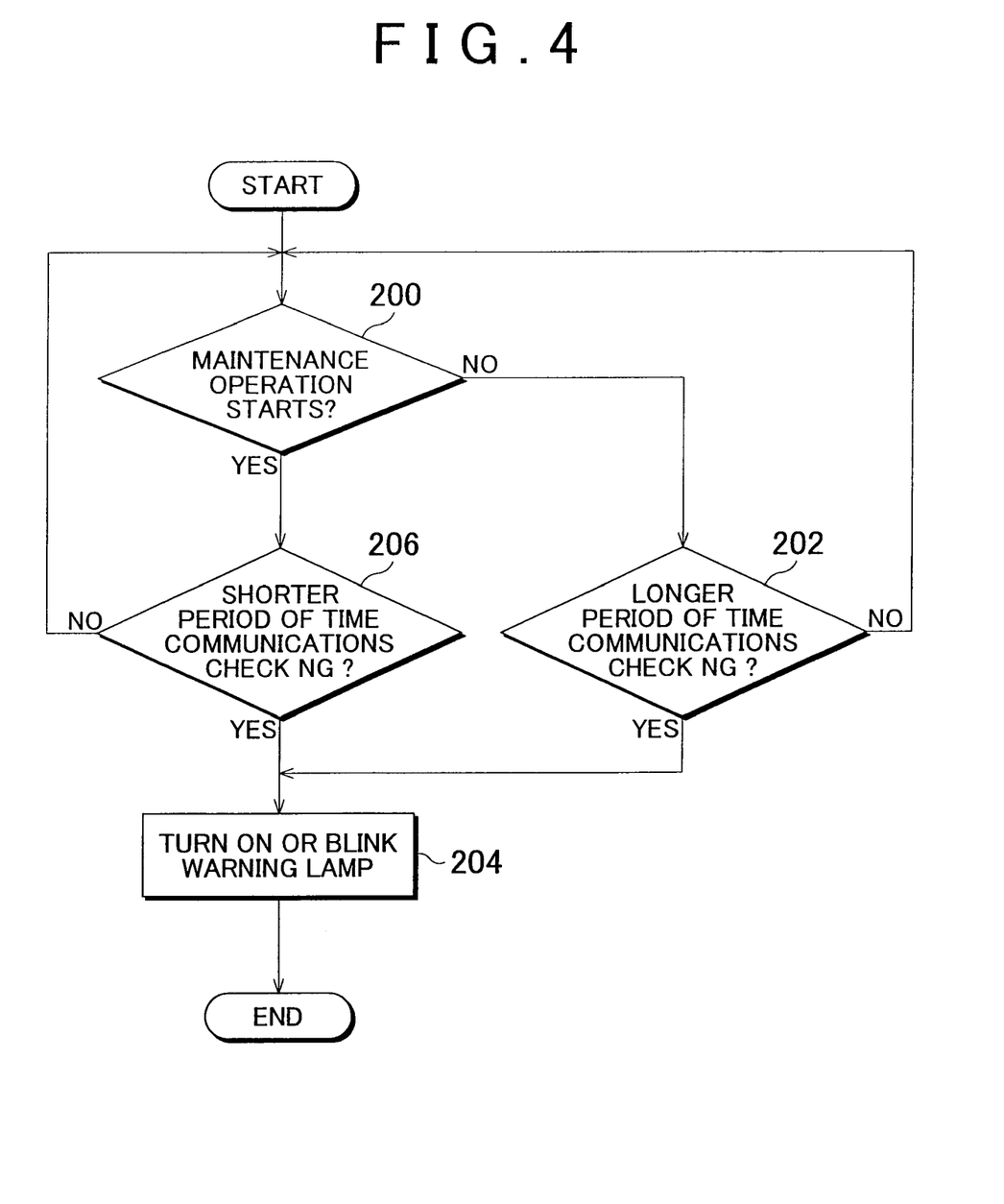
FIG. 4 illustrates a flowchart of an example of a control routine performed in a vehicle-mounted malfunction notification apparatus in accordance with a second embodiment of the present invention.

A vehicle-mounted malfunction notification apparatus 10 in accordance with a second embodiment of the present invention may be implemented by executing, instead of the routine shown in FIG. 3, that shown in FIG. 4. FIG. 4 shows a flowchart of a control routine executed by the ECU 24 in the vehicle-mounted malfunction notification apparatus 10 in accordance with this embodiment.

In the vehicle-mounted malfunction notification apparatus 10 in accordance with the second embodiment, the ECU 24 checks at specified time intervals when the vehicle is started whether the tire maintenance operation, such as replacing tires, registering ID numbers or the like, is being performed (step 200). Preferably, as in the first embodiment, it is determined that the maintenance operations being performed when it is detected that, based on a relationship of wheel speeds which are detected by wheel speed sensors of the wheels FL, FR, RL and RR, specific conditions that infer the start of the tire replacement are satisfied; when it is detected that an external tool is connected with the ECU 24 for the registration of the ID numbers; or when it is detected that a specific diagnostic check operation on the ECU 24 has started.

If it is determined that the maintenance operation has not started, it is determined, for each of the ID numbers of the air pressure sensors 12 of the wheels FL, FR, RL and RR, which are registered in the volatile memory, whether the malfunction in the radio receiver persists for a comparatively longer period of time T2 (e.g., 20 minutes or 60 minutes) (step 202).

If it is determined in the step 202 that, for all ID numbers of the air pressure sensors 12 of the wheels FL, FR, RL and RR, the malfunction in the radio receiver does not persist for the comparatively longer period of time T2, no treatment for the communication malfunction is performed thereafter.

On the other hand, for any one of the ID numbers of the air pressure sensors 12 of the wheels FL, FR, RL and RR, if the malfunction in the radio receiver persists for the comparatively longer period of time T2, the ON command for the indicator lamp 26 is issued (step 204) to notify the vehicle operator of the communications malfunction between the wheel side transmitters 18 and the vehicle main body side receiver 22. When the ON command is issued, the indicator lamp 26 is turned on, and thus the vehicle operator is notified of the communications malfunction. Moreover, when the communications malfunction between any one of wheel side transmitters 18 and the vehicle main body side receiver 22 is detected, the ECU 24 stores in the nonvolatile memory the ID numbers of the air pressure sensors 12 related to the communications malfunction in order to perform a diagnostic check later.

If it is determined in the step 200 that the maintenance operation is being performed, it is checked, for each of the ID numbers of the air pressure sensors 12 of the wheels FL, FR, RL and RR which are registered in the volatile memory, whether the malfunction in the radio receiver persists for a comparatively shorter period of time T2 (e.g., one minute or two minute) (step 206).

If it is determined in the step 206 that, for each of the ID numbers of the air pressure sensors 12 of the wheels FL, FR, RL and RR, the malfunction in the radio receiver does not persist for the comparatively shorter period of time T2, no treatment for the communication malfunction is performed thereafter. On the other hand, for any one of the ID numbers of the air pressure sensors 12 of the wheels FL, FR, RL and RR, if the malfunction in the radio receiver persists for the comparatively shorter period of time T2, the ON command for the indicator lamp 26 is issued (step 204) to notify the vehicle operator of the communications malfunction between the wheel side transmitters 18 and the vehicle main body side receiver 22. When the ON command is issued, the indicator lamp 26 is turned on, and thus the vehicle operator is notified of the communications malfunction.

After the indication through the indicator lamp 26 is given by issuing the ON command for the indicator lamp 26 in the step 204, the ECU 24 repeatedly checks, for each of the ID numbers of the air pressure sensors 12 of the wheels FL, FR, RL and RR which are registered in the volatile memory, whether normal wireless communications between corresponding transmitter 18 and the receiver 22 is restored. If the wireless communications between one or more transmitters 18 and the receiver 22 malfunctions, the indicator lamp 26 remains on. However, if normal wireless communications between all of the transmitters 18 and the receiver 22 is restored, the OFF command for the indicator lamp 26 is issued to turn off the indicator lamp 26.

As set forth above, in the vehicle-mounted malfunction notification apparatus 10 in accordance with this embodiment, if the maintenance operation such as replacing tires of the wheels equipped with the transmitters 18, registering ID numbers to the ECT or the like is not being performed, the indicator lamp 26 may be turned on when a communications malfunction between the transmitters 18 and the receiver 22 is detected and persists for a comparatively longer period of time T2. Meanwhile, if the maintenance operation is being performed, the indicator lamp 26 can be turned on if a communications malfunction between the transmitters 18 and the receiver 22 is detected and persists for a comparatively shorter period of time T2.

In accordance with the above configuration, if the maintenance operation is not being performed, when a communications malfunction between the transmitters 18 and the receiver 22 persists for a comparative long period of time, the indicator lamp 26 is turned on to notify the vehicle operator or the like of the communications malfunction. However, if the maintenance operation is being performed, even if the communications malfunction between the transmitters 18 and the receiver 22 does not persist for such long period of time, the indicator lamp 26 is turned on to notify the vehicle operator or the like of the communications malfunction.

Therefore, in the vehicle-mounted malfunction notification apparatus 10 in accordance with this embodiment, the time at which the indicator lamp 26 is turned on to indicate the execution of the maintenance operation occurs sooner than the usual time, i.e., the timing of turning on the warning lamp 26 to indicate that the malfunction in the radio receiver persists for a comparatively longer period of time (e.g., 20 minutes or 60 minutes). Accordingly, in accordance with this embodiment, the maintenance worker can easily determine whether the maintenance operation is being performed and, hence, the efficiency of the maintenance operation can be improved.

In the above second embodiment, the ECU 24 executes the process of step 206 among the routines shown in FIG. 4, thereby implementing a maintenance operation processing unit and a communication malfunction persistence-period reducing unit.

Although the indicator lamp 26 in the first and the second embodiment is turned on when the maintenance operation has started, the present invention is not limited thereto. Instead of remaining on as in the abnormal wireless communications time between the transmitters 18 and the receiver 22, the warning lamp 26 may blink at specified time intervals. Due to the above configuration, the driver or the maintenance worker can easily distinguish a malfunction in the wireless communications and the maintenance operation based on the behavior of the indicator lamp 26.

Further, although the indicator lamp 26 in the first and the second embodiment is turned on when a communications malfunction is detected between the transmitters 18 and the receiver 22, the present invention is not limited thereto. Instead of remaining on, the warning lamp 26 may blink at specified time intervals.

In the first and the second embodiment, the indicator lamp 26 provided in the instrument cluster installed in front of the driver's seat is turned on to visually notify the vehicle operator or the maintenance worker of the communications malfunction or the execution of the maintenance operation. However, an audible warning may be provided instead, for example as a buzzer sound or voice, from the speakers.

Moreover, in the first and the second embodiment, the same indicator lamp 26 is to indicate when a communications malfunction has occurred and when the maintenance operation is being performed. However, separate indicator lamps may be provided to indicate a communications malfunction has occurred and that the maintenance operation is being performed.

In addition, in the first and the second embodiment, the wireless communications between the transmitters 18 and the receiver 22 of the system that detects tire air pressures of a vehicle is checked for communications malfunctions. However, the present invention is not limited a tire air pressure detection system and may also be applied to wired or wireless communications between communications devices other systems.

While the invention has been shown and described with respect to the example embodiments, it will be understood by those skilled in the art that various changes and modifications may be made without departing from the scope of the invention as defined in the following claims.

The invention claimed is:

1. A vehicle-mounted malfunction notification apparatus that includes a communication malfunction notification unit to inform a vehicle operator of a communications malfunction when the communications malfunction is detected to persist in a communications device for a specified period of time, the apparatus comprising:
  a maintenance operation checking unit that determines whether a maintenance operation for the communications device or related parts of the communications device is being performed; and
  a maintenance operation processing unit that performs a process for informing the vehicle operator that the maintenance operation is being performed when the maintenance operation checking unit determines that the maintenance operation is being performed,
  wherein the maintenance operation processing unit includes a maintenance operation notification unit that continuously notifies the vehicle operator that the maintenance operation is being performed when the maintenance operation checking unit determines that the maintenance operation is being performed.

2. The vehicle-mounted malfunction notification apparatus according to claim 1, wherein when the communications device is detected to be operating normally after starting the notification that the maintenance operation is being performed, the maintenance operation notification unit discontinues notifying the vehicle operator that the maintenance operation is being performed.

3. The vehicle-mounted malfunction notification apparatus according to claim 1, wherein the maintenance operation processing unit includes a communication malfunction persistence-period reducing unit that shortens the specified period of time comparatively when the maintenance operation checking unit determines that the maintenance operation is being performed.

4. The vehicle-mounted malfunction notification apparatus according to claim 1, wherein when a communications malfunction occurs between transmitters and a receiver of a system that detects tire air pressures of the vehicle persists for the specified period of time, the communication malfunction notification unit turns on or blinks an indicator lamp installed in an instrument cluster to notify the vehicle operator of the communications malfunction.

5. The vehicle-mounted malfunction notification apparatus according to claim 4, wherein, the maintenance operation notification unit turns on or blinks the indicator lamp to inform the vehicle operator that the maintenance operation is being performed.

6. A vehicle-mounted malfunction notification method that informs a vehicle operator of a communications malfunction when the communications malfunction of a communications device persists for a specified period of time, the method comprising:
  determining whether a maintenance operation for the communications device, or related parts of the communications device, is being performed; and
  performing a process to give an indication to the vehicle operator continuously, when it is determined that the maintenance operation is being performed, to notify the vehicle operator that the maintenance operation is being performed.

7. The vehicle-mounted malfunction notification method according to claim 6, wherein when the communications device is detected to be operating normally after starting the notification that the maintenance operation is being performed, the notification to the vehicle operator that the maintenance operation is being performed is discontinued.

8. The vehicle-mounted malfunction notification method according to claim 6, wherein the specified period of time is set to a shorter period of time when process for notifying the vehicle operator that the maintenance operation is being performed.

9. The vehicle-mounted malfunction notification method according to claim 6, wherein when the communications malfunction between transmitters and a receiver of a system that detects tire air pressures of the vehicle persists for the specified period of time, an indicator lamp installed in an instrument cluster is turned on or blinked to inform the vehicle operator of the communications malfunction.

10. The vehicle-mounted malfunction notification method according to claim 9, wherein the indicator lamp is turned on or blinked to notify the vehicle operator that the maintenance operation is being performed.

* * * * *